Figure 1:
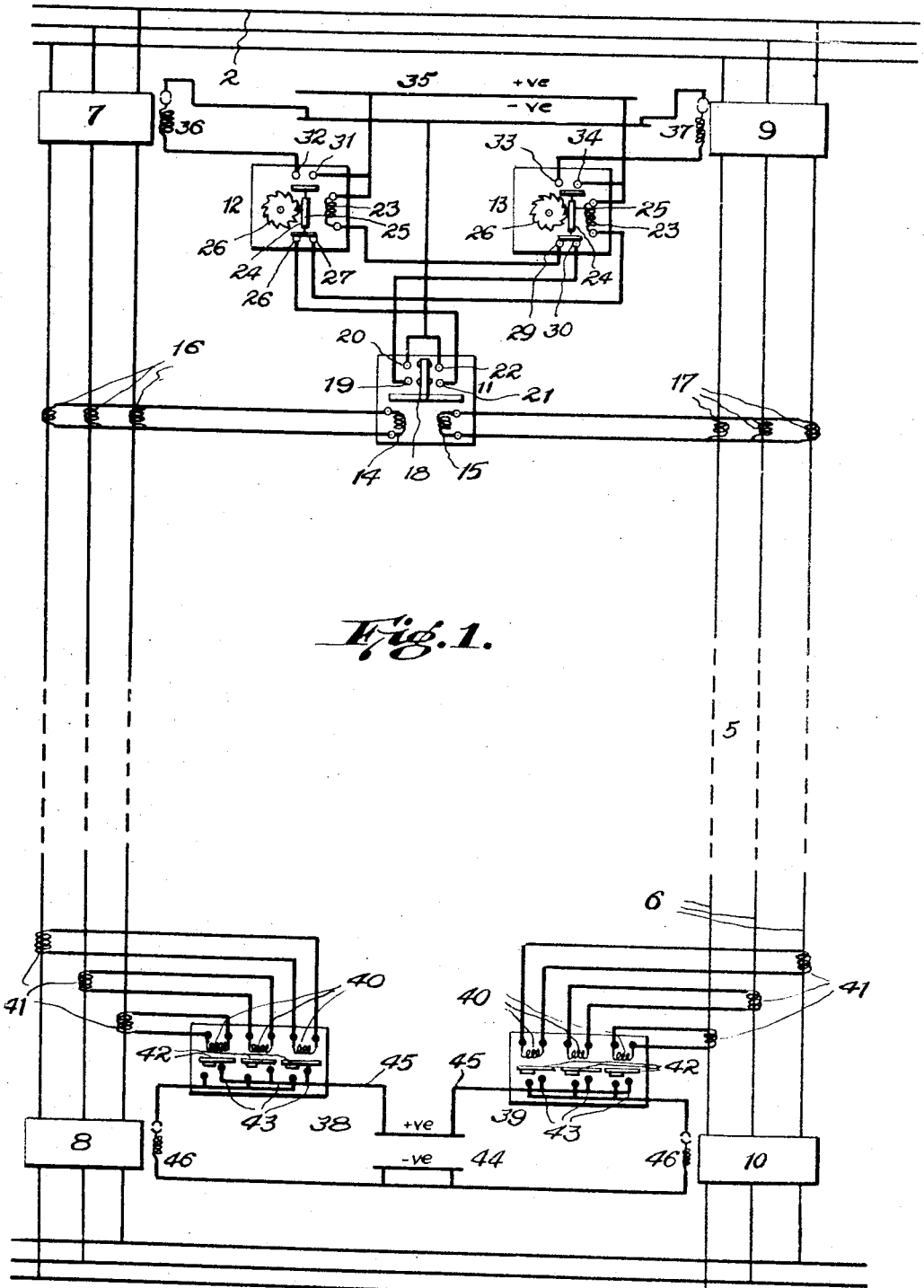
Figure 2:
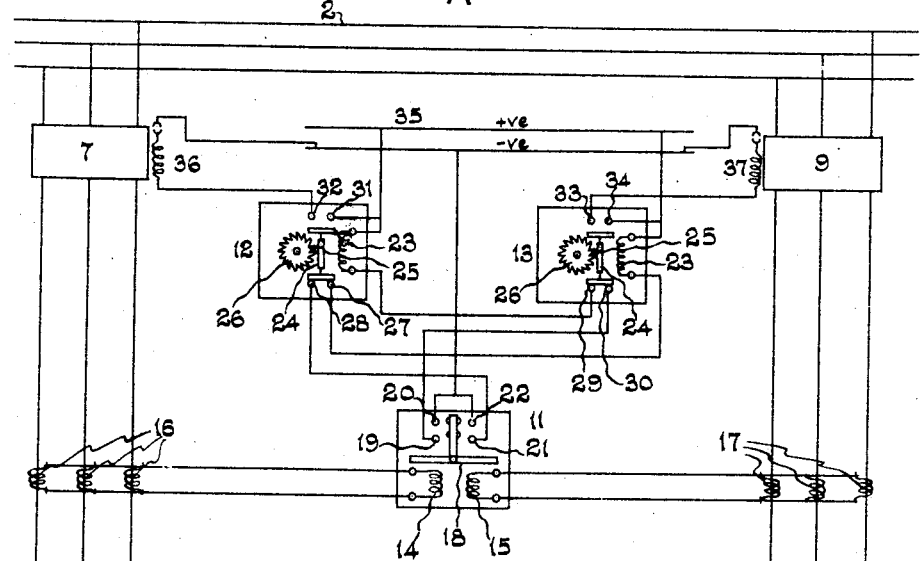
Figure 2:
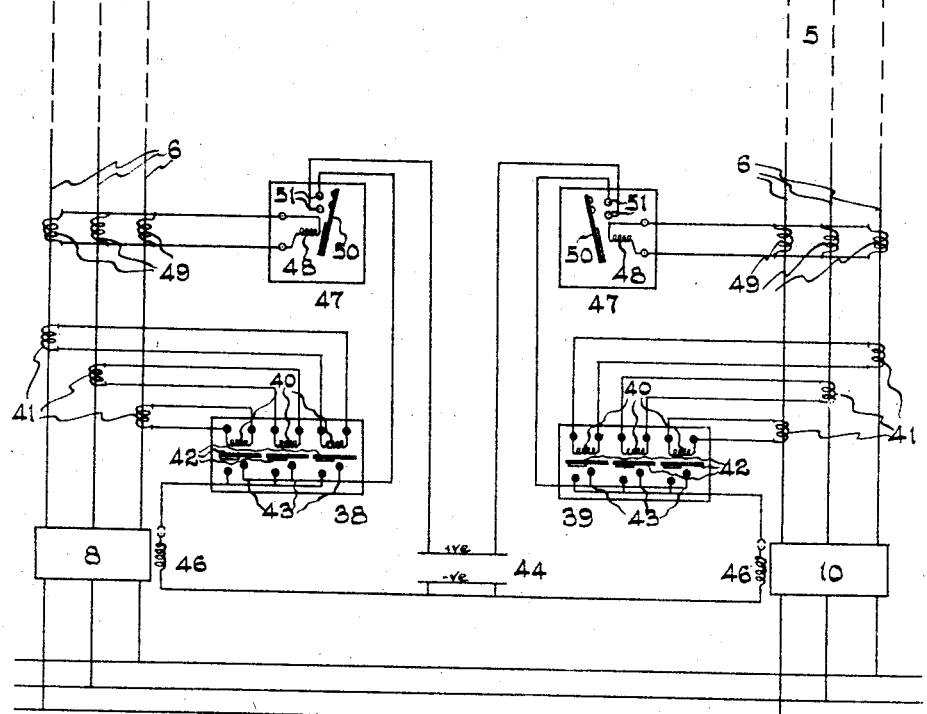

Patented Feb. 7, 1933

1,897,009

UNITED STATES PATENT OFFICE

CHARLES JAMES MONK AND EDWARD FRANK RENDELL, OF JOHANNESBURG, TRANSVAAL, UNION OF SOUTH AFRICA, ASSIGNORS TO THE VICTORIA FALLS AND TRANSVAAL POWER COMPANY, LIMITED, OF JOHANNESBURG, TRANSVAAL, UNION OF SOUTH AFRICA

AUTOMATIC ISOLATION OF PARALLEL THREE-PHASE ELECTRIC POWER TRANSMISSION LINES

Application filed October 30, 1930, Serial No. 492,310, and in the Union of South Africa December 21, 1929.

This invention relates to protective apparatus employed in connection with parallel three-phase electric power transmission systems comprising two or more parallel lines extending between the same bus bars at each end of the system; said apparatus operating in the event of one or two of the conductors of a line being short circuited to earth, and/or from one to another, at some point between the end main switches of the line: and the effect of its operation being to open the main switches and thereby isolate the line in question.

The invention is applicable to such systems irrespective of the number of paralleled lines in the system, but its chief utility is in connection with specially long transmission systems in which two lines only are employed; and in order to simplify the description, reference will be made more particularly to a two line system.

It is well known to provide for the cutting out of a faulty line of a parallel line system without regard to the condition of the remaining line; and technically satisfactory protective apparatus of this type is known, which depends upon physical connection between the ends of the lines by means of pilot cables. However the cost of such cables is a serious drawback in long lines; and attempts have been made to devise apparatus which produces the same results independently of physical connection between the ends of the line. Hitherto these attempts have been unsuccessful owing to imperfect coordination of the mechanism at one end of the line with that of the other end; a not infrequent result being the partial switching out of both lines and the failure to isolate either one completely.

Moreover all the known arrangements referred to bring about total interruption of the supply, in the event of both the lines being simultaneously faulted.

The object of the present invention is to provide a protective arrangement which does not require pilot cables and which secures definite selection and isolation of one line only; leaving the other line under load, whether or not the latter also has become faulty. This has the useful effect, when both lines have become faulty, of definitely and promptly isolating one line whilst maintaining at least a partial supply through the second line; and moreover it usually effects the breaking of the fault on the second line owing to the voltage drop in that line which results from the imposition on it of the combined load current and fault current.

According to this invention each line is provided at one end of the system with means to open its main switch at that end upon fault current flowing through any conductor of the line; and both said means are so associated by selector mechanism that only one can be operative at one time. Each line has also at its other end means responsive to low load conditions in any conductor of the line and thereby operating to open the main switch of its line at such other end. If low load conditions in the line are normal, a device responsive to substantial current in at least one conductor of the line is so associated with the low load relay that the relevant main switch is controlled jointly by said low road responsive means and said current responsive means.

Apparatus comprising the invention is shown in the accompanying diagrammatic drawing in which Fig. I shows one form of the invention and Fig. II shows a modification specially adapted for lines which are normally subject to low load. Therein, the letters A and B represent the two ends of a system comprising the bus bars 2, 3 and the parallel lines 4, 5; each line 4 or 5 consisting of three conductors 6, 6, 6. The line 4 has the main switch 7 at the A end and the main switch 8 at the B end. The line 5 similarly has the main switches 9 and 10 at its respective A and B ends.

At the A end of the system is provided the means for selecting a faulty line and opening the A main switch of the selected line, comprising the common relay 11 and the time lag relays 12, 13 individual to the lines 4 and 5 respectively. The relay 11 is responsive to fault current flowing through any one of the conductors 6, and, according to the direction or directions in which the current is or may be transmitted and according also to the conditions of loading of the system, this may be a reverse power relay, an overload relay, or, as shown, an earth leakage relay comprising the coils 14, 15. The coil 14 is connected to the common points of the current transformers 16, 16, 16 on the line 4; and the coil 15 is similarly connected to the common points of the current transformers 17, 17, 17 on the line 5.

A balanced armature 18 is arranged to be attracted by one or other of the coils 14 or 15 accordingly as fault current occurs in line 4 or line 5, and so to close the pair of contacts 19, 20 or the pair 21, 22.

Each of the time lag relays 12 and 13 comprises a coil 23 and an armature 24 which is raised upon said coil being energized. The rising movement of the armature is free. Its descent is retarded so as to occupy a definite period of time; the means for this purpose being indicated by a pawl 25 which upon descent of the armature engages and rotates a wheel 26, the rate of rotation of which is controlled by well known timing mechanism, not shown.

When the armature 24 is in its lowered position it bridges a pair of contacts, which are numbered 27, 28 in the case of relay 12; and 29, 30 in the case of relay 13. When the armature is raised it opens said contacts and bridges a pair marked 31, 32 in the case of relay 12 and 33, 34 in the case of relay 13. 35 is a battery whilst 36 and 37 indicate the electrically actuated mechanisms for tripping the main switches 7 and 9 respectively.

The following alternative circuits are provided. Firstly battery 35 to coil 23 of relay 12, bridged contacts 29, 30 of relay 13, and contacts 19, 20 of relay 11, to battery; and secondly, battery to coil 23 of relay 13, bridged contacts 27, 28 of relay 12 and contacts 21, 22 of relay 11, to battery.

Assuming that line 4 has become faulty and coil 14 is thereby energized, the first alternative circuit is completed. The armature 24 of relay 12 is accordingly lifted, and, by bridging contacts 31 and 32, closes the main switch tripping circuit from battery through said contacts, to coil 36, to battery. At the same time the possibility of the corresponding main switch 9 in line 5 being also tripped, by reason of a substantially simultaneous fault in line 5, is obviated owing to the circuit through the relay 13 being broken by the opening of the contacts 27, 28. This condition continues until completion of the retarded descent of armature 24 of relay 12, which completion may be arranged not to occur until sufficient time has elapsed for the fault on line 4 to have been cleared, and said line again brought in by the purposed closing of its main switches.

If the line 5 is the first to have become faulty (both armatures 24 being down) a similar series of steps will effect the opening of main switch 9 through relay 13, and the cutting out of relay 12.

At the B end of the system are the low load relays 38, 39 associated respectively with the lines 4 and 5. Each comprises three magnet coils 40, 40, 40 connected severally to current transformers 41, 41, 41, on the several conductors 6 of the respective line 4 or 5. Corresponding armatures 42 are withheld, by the normal energization of the coils 40, due to current flowing in the conductors 6, from bridging their associated pairs of contacts 43.

Closing of any one of these pairs 43 by its armature 42 enables current to flow from battery 44 through lead 45, through the bridged pair or pairs 43 through coil 46 to battery; coil 46 being in the tripping mechanism of the associated main switch 8 or 10.

Following the opening of the A main switch in the faulty line as above described, for instance switch 7 in line 4, the conductor or conductors of line 4 which has or have not become faulty will be under no load. The armature 42 associated with said conductor or each of them accordingly falls. Coil 46 is energized and main switch 8 is opened, thus completing the isolation of line 4 which was begun by the opening of switch 7. The isolation of the line clears the fault; and the line may thereupon be brought back into service by the re-closing of its main switches 7 and 8.

The other line 5 meanwhile remains in service whether or not it has also become faulty; since, as regards its A end its main switch 9 is prevented from being tripped as described above and as regards its B end consequently its low load relay 39 remains inoperative so long as the switch 9 remains closed. However in case it has become faulty at the same time as line 4, the imposition upon it of the combined full service current and the fault current, assisted by the characteristic of the generators usually employed in a system of the kind in question, will usually kill the fault, without its being isolated. Should this not occur, the isolation of the line will automatically take place, in the manner described in connection with line 4, as soon as the armature 24 of relay 12 has descended. It will be evident that the sequence described in connection with line 4 will also take place in line 5 whenever that line is selected by the relay 11.

The operation of the low load relay 38 or 39 is dependent upon there being at least one healthy conductor remaining in the faulted line so that such healthy conductor will be under no load. Accordingly the protective arrangement would be inoperative in the case of faults occuring simultaneously in all the conductors of a line by reason for example of a short circuit between all the phases. That event however is practically unknown in the extra high tension systems for which the invention is specially devised, owing to the wide clearance always provided between the several conductors of such a line.

In the arrangement so far described low load conditions in a line necessarily cause the opening of the B main switch of that line. In those systems where periods of low load are a normal occurrence, as shown in Fig. II wherein the lead 45 is omitted and the device 47 is provided. The essential feature of this device is that it is responsive to substantial current in at least one conductor of the line. It may therefore as shown be an earth leakage relay having a magnet coil 48 coupled through current transformers 49, 49, 49 to all the conductors of its associated line. Energization of the coil 48 causes the armature 50 to bridge the pair of contacts 51 and so take the place of lead 45.

The sequence then is that upon the opening of an A main switch, say switch 7 in line 4, at least one conductor 6 of that line is placed under no load and causes the operation of relay 38; at least one other conductor 6 of the same line continues to carry fault current from the B bus bars 3, thus causing the operation of the associated relay 47. The simultaneous operation of the relays 38 and 47 causes the B main switch 8 to open and thereby complete the isolation of line 4.

The relays 11, 12, 13, and 47 are self resetting so that a line which has become faulty is at once rendered operative upon its main switches being closed, and the protective mechanism is at once ready to deal with a subsequent fault.

We claim:—

1. A three phase electric power transmission system comprising a plurality of parallel lines, a main switch in each line at one end of the system, a device in each line at that end adapted to open its main switch upon fault current flowing through any conductor of that line, selecting mechanism controlling said devices whereby only one can be operative at one time, a main switch in each line at the other end of the system and means operating in response to low load conditions in any of the conductors of that line and controlling the main switch at such other end so as to open the latter upon becoming operative.

2. A three phase electric power transmission system comprising a plurality of parallel lines, a main switch in each line at one end of the system, a device in each line at that end adapted to open its main switch upon fault current flowing through any conductor of that line, selecting mechanism controlling said devices whereby only one can be operative at one time, a main switch in each line at the other end of the system, means controlling the main switch at such other end of each line and comprising means responsive to low load conditions in at least one of the conductors of the line and comprising also means simultaneously responsive to substantial current in at least one of the conductors of the line, said last named means operating to open the main switch at its end of the line.

3. A three phase electric power transmission system comprising a plurality of parallel lines, a main switch in each line at one end of the system, a device in each line at that end adapted to open its main switch upon fault current flowing through any conductor of that line, selecting mechanism controlling said devices whereby only one can be operative at one time, a main switch in each line at the other end of the system there being for each line at such other end thereof a low load relay including three single pole electromagnetic elements having their windings coupled severally to the conductors of that line, the contacts of said elements being normally open, also at such other end of each line a current responsive device consisting of a single electromagnetic element coupled to the several conductors of that line and having its contacts normally open, and means for tripping the main switch comprising an electric circuit which is completed through the contact of the current responsive device and any of the contacts of the low load relay.

In testimony whereof we affix our signatures.

CHARLES JAMES MONK.
EDWARD FRANK RENDELL.